US012361812B2

(12) United States Patent
Hua et al.

(10) Patent No.: US 12,361,812 B2
(45) Date of Patent: Jul. 15, 2025

(54) METHODS AND SYSTEMS FOR REMOTELY INTERACTING WITH A FUME HOOD USING A MOBILE DEVICE

(71) Applicant: Honeywell International Inc., Charlotte, NC (US)

(72) Inventors: Wei Hua, Acton, MA (US); Robert S. Klamka, Westford, MA (US); Liwen Yu, Acton, MA (US); David R. Boisvert, North Chelmsford, MA (US); Mason R. Walls, Hudson, MA (US); James M. Barrette, Ashburnham, MA (US); Aline Pamela Munoz, Mexico City (MX); Jose Jorge Figueroa Figueroa, Mexico City (MX)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 115 days.

(21) Appl. No.: 18/127,623

(22) Filed: Mar. 28, 2023

(65) Prior Publication Data
US 2024/0331525 A1     Oct. 3, 2024

(51) Int. Cl.
*G08B 21/18*     (2006.01)
*B08B 15/02*     (2006.01)
*G06F 3/04847*     (2022.01)

(52) U.S. Cl.
CPC ............ *G08B 21/18* (2013.01); *B08B 15/023* (2013.01); *G06F 3/04847* (2013.01)

(58) Field of Classification Search
CPC ... G08B 21/18; B08B 15/023; G06F 3/04847; G06F 3/0484; H04W 76/10
See application file for complete search history.

(56) References Cited

U.S. PATENT DOCUMENTS 4,150,606 A * 4/1979 Nelson .................. B08B 15/023
                                                           49/357
4,155,289 A * 5/1979 Garriss ................. B08B 15/023
                                                   118/DIG. 7

(Continued)

FOREIGN PATENT DOCUMENTS

AU           B6373090          5/1991
AU        2018101644 A4     12/2018

(Continued)

OTHER PUBLICATIONS

Antec Curve Advanced Cloud Based Monitoring, Antec Controls, 4 pages, 2022.

(Continued)

*Primary Examiner* — Hoi C Lau
(74) *Attorney, Agent, or Firm* — Seager, Tufte & Wickhem, LLP

(57) ABSTRACT

A fume hood monitor includes a fume hood monitor controller that is configured to display one or more of the fume hood parameters on a display of the fume hood monitor and to communicate with the mobile device. The mobile device includes a mobile device controller that is configured to pair the mobile device with the fume hood monitor. Once paired, the mobile device controller is configured to receive two or more of the fume hood parameters from the fume hood monitor controller, display two or more of the received fume hood parameters on a display of a user interface of the mobile device, and receive a user interaction via the user input device of the mobile device. The user interaction may allow a user to manipulate information that is displayed on the display of the mobile device regarding the fume hood.

16 Claims, 17 Drawing Sheets

(56) References Cited

U.S. PATENT DOCUMENTS

| | | | | |
|---|---|---|---|---|
| 4,466,341 A * | 8/1984 | Grogan | ................... | B08B 15/02 340/611 |
| 4,502,375 A * | 3/1985 | Hignite | ................ | B08B 15/023 454/56 |
| 4,528,898 A * | 7/1985 | Sharp | ................... | B08B 15/023 454/61 |
| 4,706,553 A * | 11/1987 | Sharp | ................... | B08B 15/023 454/61 |
| 4,773,311 A * | 9/1988 | Sharp | ................... | B08B 15/023 454/56 |
| 4,893,551 A * | 1/1990 | Sharp | ................... | B08B 15/023 454/59 |
| 4,934,256 A * | 6/1990 | Moss | ................... | B08B 15/023 454/61 |
| 5,092,227 A * | 3/1992 | Ahmed | ................... | F24F 3/163 454/59 |
| 5,115,728 A * | 5/1992 | Ahmed | ................ | G05D 16/208 454/340 |
| 5,117,746 A * | 6/1992 | Sharp | ................... | B08B 15/023 454/61 |
| 5,170,673 A * | 12/1992 | Ahmed | ................... | B08B 15/023 454/56 |
| 5,215,497 A * | 6/1993 | Drees | ................... | B08B 15/023 454/61 |
| 5,240,455 A * | 8/1993 | Sharp | ................... | B08B 15/023 454/343 |
| 5,262,578 A * | 11/1993 | Hall | ................... | B25J 21/02 588/259 |
| 5,385,505 A * | 1/1995 | Sharp | ................ | G05D 16/2053 454/238 |
| 5,406,073 A * | 4/1995 | Sharp | ................... | G01V 8/10 250/221 |
| 5,439,414 A * | 8/1995 | Jacob | ................... | B08B 15/023 454/61 |
| 5,450,873 A * | 9/1995 | Palmer | ................... | F24F 11/75 137/501 |
| 5,545,086 A * | 8/1996 | Sharp | ................... | F24F 11/0001 454/238 |
| 5,562,537 A * | 10/1996 | Zver | ................... | B08B 15/023 454/56 |
| 5,733,188 A * | 3/1998 | Jacob | ................... | G01P 1/10 454/56 |
| 5,882,254 A * | 3/1999 | Jacob | ................... | B08B 15/023 454/56 |
| 6,137,403 A * | 10/2000 | Desrochers | ............ | G01D 5/145 340/545.9 |
| 6,252,689 B1 * | 6/2001 | Sharp | ................... | G08C 23/06 398/115 |
| 6,739,967 B2 * | 5/2004 | Saito | ................... | B08B 15/002 454/56 |
| 6,909,921 B1 * | 6/2005 | Bilger | ................... | G08B 21/0492 700/63 |
| 6,914,532 B2 * | 7/2005 | Crooks | ................... | F24F 11/74 340/506 |
| 6,935,943 B2 * | 8/2005 | Desai | ................... | B08B 15/023 454/61 |
| 6,960,126 B2 * | 11/2005 | Desai | ................ | B01L 1/50 454/61 |
| 6,994,619 B2 * | 2/2006 | Scholten | ................ | B08B 15/023 454/61 |
| 7,532,541 B2 * | 5/2009 | Govindswamy | ........ | G01S 15/89 367/88 |
| 7,994,480 B2 * | 8/2011 | Johnson | ................ | G01J 5/0265 250/370.08 |
| 9,694,398 B2 * | 7/2017 | Stakutis | ................ | B08B 15/023 |
| 9,906,841 B2 * | 2/2018 | Kim | ................ | H04N 21/43637 |
| 11,550,533 B2 * | 1/2023 | Yamaguchi | ........ | H04N 1/00477 |
| 11,801,538 B2 * | 10/2023 | Desrochers | ............ | F24F 3/163 |
| 2004/0072529 A1 * | 4/2004 | Desai | ................... | B08B 15/023 454/61 |
| 2004/0209564 A1 * | 10/2004 | Desai | ................ | B01L 1/50 454/56 |
| 2005/0024216 A1 * | 2/2005 | Crooks | ................... | F24F 11/49 340/606 |
| 2005/0048900 A1 * | 3/2005 | Scholten | ................ | B08B 15/023 454/61 |
| 2006/0079164 A1 * | 4/2006 | DeCastro | ............... | B08B 15/023 454/56 |
| 2007/0065134 A1 * | 3/2007 | Sugimoto | .............. | H04N 23/71 396/165 |
| 2008/0065243 A1 * | 3/2008 | Fallman | ............. | G05B 23/0267 700/83 |
| 2009/0177810 A1 * | 7/2009 | Kweon | ................. | H04L 67/303 710/33 |
| 2009/0191803 A1 * | 7/2009 | Barrette | ................... | B08B 15/02 454/56 |
| 2009/0211451 A1 * | 8/2009 | Hauville | ............... | B08B 15/023 55/482 |
| 2010/0265316 A1 * | 10/2010 | Sali | ....... | H04N 13/254 348/46 |
| 2011/0137447 A1 * | 6/2011 | Hermann | ........... | G05B 23/0251 700/108 |
| 2011/0147017 A1 * | 6/2011 | Saglam | ................... | A62C 3/006 169/65 |
| 2011/0164032 A1 * | 7/2011 | Shadmi | ................... | G06F 3/017 345/419 |
| 2011/0253693 A1 * | 10/2011 | Lyons | ................... | A47J 27/00 219/209 |
| 2012/0052792 A1 * | 3/2012 | Sinur | ....................... | F24F 11/30 454/341 |
| 2013/0002845 A1 * | 1/2013 | Fedorenko | ........ | G08B 13/19604 348/E7.085 |
| 2013/0052927 A1 * | 2/2013 | Broemsen | ............... | G03B 21/28 454/56 |
| 2013/0125233 A1 * | 5/2013 | Bush | ................... | G05B 23/0216 726/19 |
| 2013/0233411 A1 * | 9/2013 | Donohue | ................ | F24F 11/74 137/502 |
| 2014/0028711 A1 * | 1/2014 | Kincaid | ................... | G06F 3/013 345/633 |
| 2014/0094106 A1 * | 4/2014 | McIlhany | ........... | G01B 11/285 356/628 |
| 2014/0120819 A1 * | 5/2014 | Stakutis | ................ | B08B 15/023 454/56 |
| 2014/0130574 A1 * | 5/2014 | Happ | ................... | F24F 11/0001 73/31.01 |
| 2015/0212714 A1 * | 7/2015 | Hua | ................... | G05B 19/409 715/739 |
| 2015/0227123 A1 * | 8/2015 | Laycock | ............... | G05B 19/409 700/83 |
| 2016/0299577 A1 * | 10/2016 | Trau | ................... | G16H 50/20 |
| 2017/0270848 A1 * | 9/2017 | Liu | ................ | H04N 21/43637 |
| 2017/0360639 A1 * | 12/2017 | Corona | ................... | F24F 7/003 |
| 2018/0005603 A1 * | 1/2018 | Saroor | ................... | G09G 5/14 |
| 2018/0288594 A1 * | 10/2018 | Kim | ................... | G07F 13/06 |
| 2018/0299863 A1 * | 10/2018 | Caine | ................... | H04L 67/12 |
| 2020/0201976 A1 * | 6/2020 | Cen | ................... | G06F 3/0481 |
| 2020/0326801 A1 * | 10/2020 | Nixon | ................... | G05B 13/02 |
| 2021/0291242 A1 * | 9/2021 | Desrochers | ........... | B08B 15/023 |
| 2023/0045713 A1 * | 2/2023 | Wohlstadter | .......... | G06F 3/0482 |
| 2024/0009715 A1 * | 1/2024 | Desrochers | ........... | B08B 15/023 |
| 2024/0328652 A1 * | 10/2024 | Hua | ................... | H04W 76/10 |
| 2024/0331525 A1 * | 10/2024 | Hua | ................... | B08B 15/023 |

FOREIGN PATENT DOCUMENTS

| | | |
|---|---|---|
| CN | 105149313 A | 12/2015 |
| CN | 109426524 A | 3/2019 |
| CN | 109521726 A | 3/2019 |
| CN | 212821674 U | 3/2021 |
| CN | 113033316 A | 6/2021 |
| CN | 114740774 A | 7/2022 |
| CN | 218240715 U * | 1/2023 |
| DE | 10028333 A1 | 12/2001 |
| EP | 0541864 A1 | 5/1993 |
| EP | 1745866 A1 | 1/2007 |
| JP | 2004069121 A | 3/2004 |
| WO | 9113700 A1 | 9/1991 |

(56) References Cited

FOREIGN PATENT DOCUMENTS

| WO | 9513146 A1 | 5/1995 |
|---|---|---|
| WO | 0033983 A1 | 6/2000 |
| WO | 2007149584 A2 | 12/2007 |

OTHER PUBLICATIONS

Apex Premier High Performance Velocity Monitor, Accutrol LLC Product Sheet, 4 pages, 2022.
Apex High Performance Velocity Alarm Accutrol LLC Product Sheet, 4 pages, 2022.
AVC Fume Hood Control System, Accutrol, LLC Product Sheet, 4 pages, 2022.
Demystifying Fume Hood Control Systems with a Simple, Intuitive User Interface, Accutrol, LLC, 5 pages, 2022.
Touchscreen FHM3, Fume Hood Monitor, Accutrol, LLC, Product Sheet, 2 pages, 2022.
Fume Hood Brochure, Confidence in Managing Laboratory Fume Hoods, Eurotherm, 8 pages, 2021.
"The Technology Behind the Microsoft xBox Motion Control System," 2 pages, Printed Sep. 1, 2011.
Hakansson et al., "Sound Focusing by Flat Acoustic Lenses without Negative Infraction," Applied Physics Letters, American institute of Physics, vol. 86, 3 pages, Downloaded Jan. 25, 2005, 054102-1, http://apl.aip.org/spl/copyright.jsp.
Holland et al., "Air Couples Acoustic Imaging with Zero-Group-Velocity Lamb Modes," Applied Physics Letters, vol. 83, No. 13, pp. 2704-2706, Sep. 29, 2003.
I.D.E.A. Prime Sense 3D Sensor, Blog Archive, 2 pages, Printed 2012.
Keegan@TI, How Mmwave Sensors Create Technology Advantages for Independent "Assisted" Living, e2@ti.com/blogs, 4 pages, Jan. 18, 2022. Accessed Mar. 3, 2023.
Low-Power, High-Sensitivty Infrared Sensor for Presence and Motion Motion Detection, Data Brief, ST Microelctronics, STHS34PF80, 13 pages, 2021.
Hood Presence Sensor ZPS-H, Accutrol, LLC Product Sheet, Oct. 2018.
Cava Manual, v105 Touchscreen Fume Hood Controller, Antec Controls, 27 pages, 2022.
MVM Manual v126, Multi-Variable Monitor, Antec Controls, 42 pages, 2022.
Pace Manual, v111, Critical Space Controller, Antec Controls, 23 pages, 2022.
PMT Manual, v114, Touchscreen Room Pressure Monitor, 35 pages, 2022.
Mukhopadhyay et al., "Synthetic Aperture Sonar 3-D Imaging of Targets in Air using Multiple, non-Parallel Shot Lines," 2005 IEEE International Geoscience and Remote Sensing Symposium, vol. 1, 4 pages, Jul. 25-29, 2005 IBSN:0-7803-9050-4.
Murino, "Reconstruction and Segmentation of Underwater Acoustic Images Combining Confidence Information in MRF models," Pattern Recognition, vol. 34, pp. 981-997, 2001.
Open NI™, "Program Guide," Printed 2012, 21 pages.
Patel, "Segmentation of 3D Acoustic Images for Object Recognition Purposes," University College London, 5 pages, before May 2013.
International Search Report and Written Opinion for International Application No. PCT/US2013/062991 11 pages, mailing date Dec. 26, 2013.
Phoenix Controls Corporation, "Sash Sensors," Jul. 2000.
Phoenix Controls Corporation, Laboratory Guide Specification X30 Fume Hood Monitor and Zone Presence Sensor (ZPS) 200 Series, 2 pages, Mar. 2006.
Phoenix Controls Corporation X30 Series Fume Hood Monitors, 13 pages, Feb. 2005.
Phoenix Controls Corporation, X30 Fume Hood Monitors, 15 pages, Jun. 2006.
Phoenix Controls Corporation, X30 Fume Hood Monitors Users Manual, 18 pages, Jun. 2006.
Scientific Equipment & Furniture Association, "Recommended Practices for Laboratory Fume Hoods," SEFA Desk Reference, Revision 1,pp. 57-135, 2006.
Siemens, Fume Hood Monitor, Technical Specification Sheet, Rev. 2, 4 pages, Apr. 2001.
Siemens Fume Hood Operating Display Panel, 12 pages, 2020.
Siemens Fume Hood Operating Display—Thin and Flush Mount, 11 pages, 2020.
"Fume Hoods", Stanford Laboratory Standard and Design, 24 pages, 2005.
Stenholt, "Stereo Rendering," Powerpoint Presentation, 45 slides, Before Jun. 2013.
Texas Instruments, 1WR6843AOP Single Chip 60 to 64 GHz mmWave Sensor Antennas-On-Package (AOP), 81 pages, Apr. 2020, Revised Jul. 2022.
Time of Flight 8x8 Multizone Ranging Sensor with Wide Field of View, VL53l5Cx Datasheet, 38 pages, 2023.
Area Presence Sensor ZPS-A, Accutrol LLC Product Sheet, 2 pages, 2022.
Hood Presence Sensor, Accutrol, LLC Product Sheet, 2 pages, 2022.
Extended European Search Report, EP Application No. 24163441.9, European Patent Office, Aug. 30, 2024 (46 pages).

\* cited by examiner

METHODS AND SYSTEMS FOR REMOTELY INTERACTING WITH A FUME HOOD USING A MOBILE DEVICE

TECHNICAL FIELD

The present disclosure relates generally to fume hoods, and more particularly to methods and systems for interacting with a fume hood using a mobile device.

BACKGROUND

Fume hoods are commonly used when personnel are handling potentially harmful materials, particularly substances that give off noxious fumes. Fume hoods can often be found in educational, industrial, medical and government laboratories and production facilities. A typical fume hood may include a housing within which the harmful materials may be stored and used. Users typically access the interior of the fume hood housing through an opening, which in some cases, may be selectively opened and closed via one or more movable sashes or the like. The fume hood housing is typically vented by a ventilation device so that air and potentially harmful gases or other materials within the housing are positively exhausted out of the building through ductwork. Such venting typically draws fresh air in through the fume hood opening, which helps keep any potentially harmful materials within the fume hood and out of the space where personnel may be located.

Fume hoods typically include a fume hood monitor that is mounted to a frame or the like of the fume hood. The fume hood monitor typically includes a user interface that allows a user standing at the fume hood to view and/or set one or more parameters of the fume hood. What would be desirable is a system and method that facilitates remotely interacting with a fume hood using a mobile device.

SUMMARY

The disclosure relates generally to fume hoods, and more particularly to methods and systems for interacting with a fume hood using a mobile device. An example may be found in a fume hood system that includes a fume hood including a fume hood monitor that is configured to communicate with a mobile device. The fume hood monitor includes a user interface including a display and a user input device, a wireless interface, a memory for storing a plurality of fume hood parameters associated with the fume hood, and a controller operatively coupled to the user interface, the wireless interface and the memory of the fume hood monitor. The controller of the fume hood monitor is configured to display one or more of the fume hood parameters on the display of the fume hood monitor and to communicate with the mobile device via the wireless interface. The mobile device includes a user interface including a display and a user input device, a wireless interface, a memory, and a controller operatively coupled to the user interface, the wireless interface and the memory of the mobile device. The controller of the mobile device is configured to pair the mobile device with the fume hood monitor via the wireless interface of the mobile device and the wireless interface of the fume hood monitor, resulting in a paired wireless connection. Once paired, the controller of the mobile device is configured to receive two or more of the fume hood parameters from the controller of the fume hood monitor via the paired wireless connection, display two or more of the received fume hood parameters on the display of the user interface of the mobile device, and receive a user interaction via the user input device of the mobile device. In some cases, the user interaction allows a user of the mobile device to manipulate information that is displayed on the display of the mobile device regarding the fume hood.

Another example may be found in a mobile device. The mobile device includes a user interface including a display and a user input device, a wireless interface, a memory, and a controller operatively coupled to the user interface, the wireless interface and the memory of the mobile device. The controller of the mobile device is configured to pair the mobile device with one or more fume hoods via the wireless interface of the mobile device, resulting in a paired wireless connection with each of the one or more fume hoods. The controller of the mobile device is further configured to receive one or more fume hood parameters from each of the one or more fume hoods via the corresponding paired wireless connection, display one or more of the received fume hood parameters on the display of the mobile device, and concurrently display on the display of the mobile device a status of each of two or more experiments currently associated with one or more of the fume hoods.

Another example may be found in a non-transitory computer readable medium storing instructions thereof that when executed by one or more processors of a mobile device causes the one or more processors to receive one or more of fume hood parameters from each of one or more fume hoods via a corresponding paired wireless connection. The one or more processors are caused to display one or more of the received fume hood parameters on a display of the mobile device. The one or more processors are caused to receive a user interaction via the mobile device, the user interaction allowing a user to manipulate information that is displayed on the display of the mobile device regarding operation of the one or more fume hoods.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIG. 7A is a screen shot of an illustrative screen that may be displayed on a smartphone while

FIG. 8A is a screen shot of an illustrative screen that may be displayed on a smartphone while

FIG. 9A is a screen shot of an illustrative screen that may be displayed on a smartphone while

FIG. 10A is a screen shot an of illustrative screen that may be displayed on a smartphone while

FIGS. 11A and 11B are screen shots of illustrative screens that may be displayed on a smartphone while

FIG. 12A is a screen shot of an illustrative screen that may be displayed on a smartphone while

Figure 1:
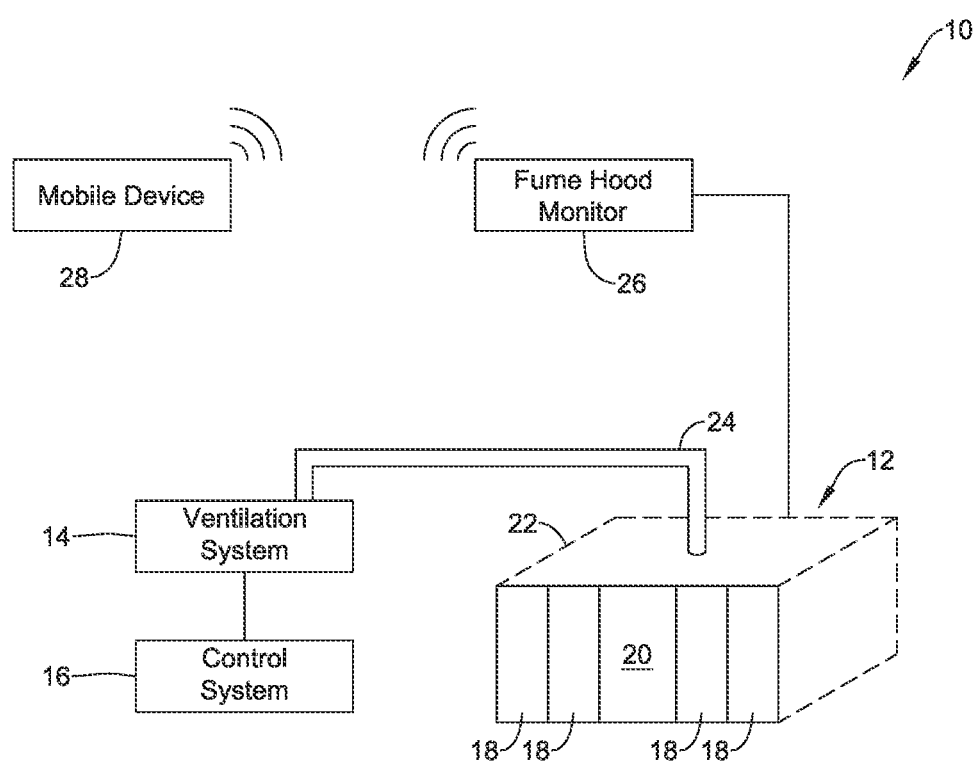
FIG. 1 is a schematic block diagram of an illustrative fume hood system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

FIG. 1 is a schematic block diagram showing an illustrative fume hood system 10. The illustrative fume hood system 10 includes a fume hood 12, a ventilation system 14 and a control system 16. The fume hood 12 may include one or more moveable sashes 18 (a total of four are shown) that are mechanically coupled to the fume hood 12. The one or more moveable sashes 18 may be moved back and forth in order to either increase or decrease a size of an opening 20 that is formed between the one or more moveable sashes 18. In some instances, particularly when there are multiple moveable sashes 18, the moveable sashes 18 may travel within one or more tracks that are disposed at or near a front of the fume hood 12. This is just an example fume hood configuration.

The fume hood 12 may be used in, for example, educational, industrial, medical (e.g. biological safety cabinets) and/or government facilities to help facilitate handling of potentially harmful materials, particularly substances that emit noxious fumes or may include pathogens or other harmful agents. In some instances, the fume hood 12 may include a housing and/or enclosure 22 within which materials may be stored, examined, and/or used. Users may access an interior of the housing and/or enclosure 22 via the opening 20 using the movable sashes 18. To facilitate containment of the potentially harmful materials within the fume hood 12, a negative pressure may be created in the interior of the housing and/or enclosure 22 (relative to the exterior of the housing and/or enclosure 22) by the ventilation system 14 (e.g., a fan, a blower, etc.) by drawing air through the fume hood opening 20 and exhausting the air through a ductwork 24 to an exterior of the building.

Proper airflow may be desirable to prevent harmful materials from exiting the fume hood through the opening 20 and into the space where personnel may be located. In some cases, the ventilation system 14 may include a filter (e.g., a HEPA filter, a ULPA filter, etc.) or other decontamination device (e.g., a scrubber) to help remove harmful materials and/or pathogens from the exhausted air. Proper control of airflow through the fume hood opening 20 may be important for safety, economic, comfort or other reasons. For example, if airflow through the fume hood opening 20 is too low (e.g., the face velocity of air flowing through the opening is too low), contaminants inside the fume hood 12 may have an opportunity to exit the fume hood 12 through the opening 20. This may present a safety issue. However, maintaining a high volume of airflow through the fume hood opening 20 at all times may be wasteful because unnecessarily large volumes of conditioned air (e.g., cooled or heated air) in the room may be drawn into the fume hood 12 and exhausted from the building. In such cases, additional air would need to be conditioned and supplied to the room to replace the exhausted air to maintain comfort in the room. By controlling the airflow of the fume hood 12, it has been found that airflow can be maintained at a level that helps ensure safe operation of the fume hood 12, while reducing costs associated with supplying conditioned air to the building where the fume hood 12 is installed. Further, energy required to drive the ventilation system 14 (e.g. fan) may be reduced, providing additional savings. The control system 16 may control operation of the ventilation system 14 in such a way as to provide safety while minimizing energy costs, for example.

Depending on the application and/or installation, the fume hood 12 may be a bench-mounted fume hood, a floor-mounted fume hood, a portable fume hood, or any other type of fume hood. A bench-mounted fume hood may be installed such that the work surface is positioned at a standing-work height and may be used, for example, in an educational laboratory, an industrial laboratory, or a medical laboratory for limiting exposure to hazardous and/or noxious fumes, vapors, and/or dust. A floor-mounted (e.g., walk-in) fume hood may likewise be used in industrial, educational, or medical settings when large amounts of hazardous materials must be safely contained, while limiting exposure to hazardous and/or noxious fumes, vapors or dust. In some cases, a floor-mounted fume hood may be used to accommodate large amounts of hazardous material, larger equipment, and/or to facilitate access by a number of individuals. A portable fume hood may be used, for example, in settings where a permanently installed fume hood would not be practical, such as in laboratories having limited space and/or where a small containment area is needed, or for temporary or other short term use. In some instances, uses for a portable fume hood include, but are not limited to, chemical fume control, pharmaceutical compounding containment, soldering applications, light dust removal, biological applications, and other applications.

In some instances, the fume hood opening 20 is defined by one or more moveable sashes 18. The moveable sashes 18 may include panes, doors, strip curtains and/or other structure for enclosing the interior space of the fume hood 12. In some cases, the moveable sashes 18 may include a combination of panes, doors and/or strip curtains. For example, the moveable sashes 18 may be configured to open vertically, horizontally, or a combination of horizontally and vertically. In some cases, the fume hood 12 may be configured with one or more vertical moving sashes 18 and strip curtains affixed to the lower edge of the lowest vertical moving sash to allow access to the fume hood interior while still providing very significant containment. In some cases, the fume hood 12 may have two or more openings 20 defined by independently operating moveable sashes 18.

The ventilation system 14 may be configured to maintain an airflow through the fume hood 12. In some cases, the airflow may have a specified minimum airflow (e.g., when the moveable sashes 18 are fully closed), and a specified maximum airflow (e.g. when the moveable sashes 18 are fully open), such as to help ensure safe operation while reducing costs. In one example, the specified ventilation rates may be based on one or more industry standards provided by the American National Standards Institute (ANSI) and/or the American Industrial Hygiene Association (AIHA) (e.g., ANSI/AIHA Z9.5 Laboratory Ventilation), The Occupational Safety & Health Administration (OSHA) (e.g., OSHA Technical Manual, Section III: Chapter 3 Ventilation Investigation, OSHA Part 1910.1450), and/or The Scientific Equipment and Furniture Association (SEFA) (e.g., SEFA 1.2 Laboratory Fume Hoods Recommended Practices). Such standards define airflow requirements at the fume hood opening, typically specifying that the face velocities (e.g., air velocity through the fume hood opening 20) should remain within the range from about 60 feet per minute to about 125 feet per minute. Often, the recommended face velocity may depend on the relative toxicity and/or hazard of the materials within the fume hood 12 or the operations within the fume hood 12, or both.

The fume hood system 10 includes a fume hood monitor 26. In some instances, the fume hood monitor 26 may be physically mounted on a front panel of the fume hood 12. In some instances, the fume hood monitor 26 provides a display for information generated by the fume hood 12. In some instances, the fume hood monitor 26 may be configured to communicate with a mobile device 28. The mobile device 28 may be a smartphone, a smartwatch, a tablet, or any other suitable portable device. In some instances, the mobile device 28 may be configured to display information received from the fume hood monitor 26. In some instances, the particular information that is displayed, the format of the information that is displayed and/or the layout of the information that is displayed on the mobile device may be personalized to the accommodate the user of the mobile device. In some instances, the mobile device 28 may be configured to communicate information and/or commands to the fume hood monitor 26. For example, the mobile device 28 may be used to acknowledge an alarm of the fume hood, send a command to for example change the face velocity setting of the fume hood, start and/or stop a timer maintained by the fume hood monitor 26, and/or communicate any other suitable information and/or command to the fume hood monitor 26.

Figure 2:
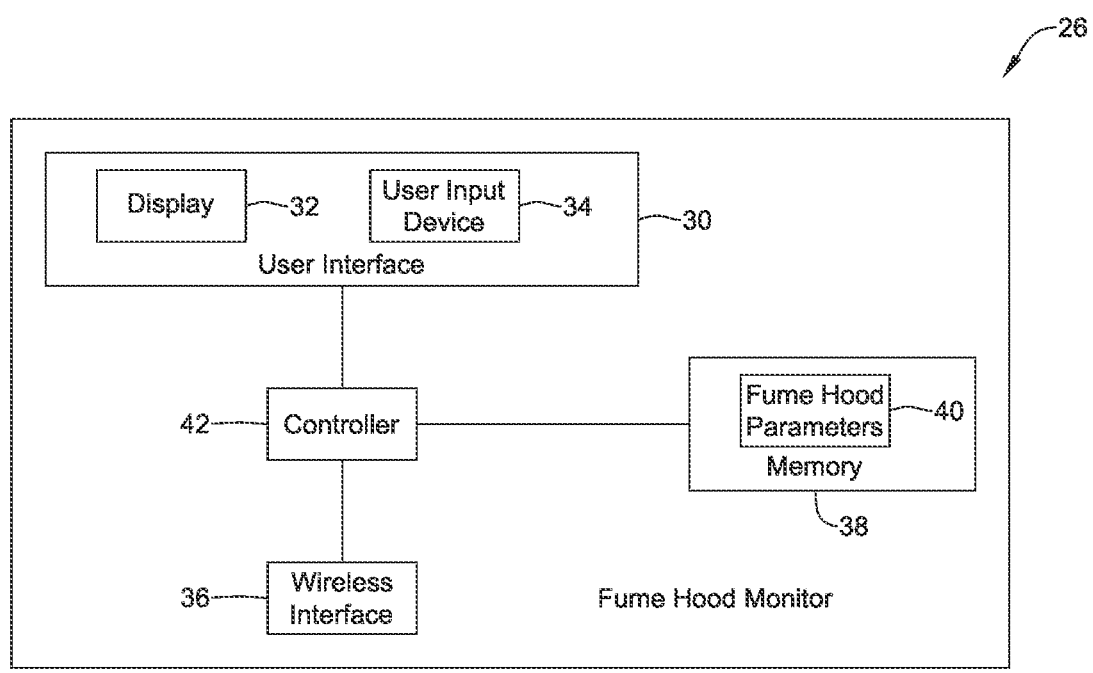
FIG. 2 is a schematic block diagram of an illustrative fume hood monitor forming a portion of the illustrative fume hood system of FIG. 1.

FIG. 2 is a schematic block diagram of the fume hood monitor 26 of FIG. 1. The fume hood monitor 26 may include a user interface 30 that itself includes a display 32 and a user input device 34. In some instances, the user interface 30 may include a touchscreen display that functions as both the display 32 and the user input device 34. In some instances, the display 32 and the user input device 34 may be separate, such as when the user input device 34 includes a keypad that a user can enter information on. The illustrative fume hood monitor 26 includes a wireless interface 36 that may be used to communicate with other devices, such as but not limited to, the mobile device 28 of FIG. 1. The fume hood monitor 26 includes a memory 38. In some cases, the memory 38 may store a set of fume hood parameters 40. Examples of fume hood parameters 40 include but are not limited to a fume hood identifier that uniquely identifies the fume hood, a fume hood location that identifies a location of the fume hood, a current face velocity setting of the fume hood, a current sash percent opening of the fume hood, a timer value associated with the fume hood, an alarm associated with the fume hood, an experiment identifier identifying an experiment that is associated with the fume hood, an experiment status identifying a status of an experiment that is associated with the fume hood, and a personnel identifier that identifies a person responsible for an experiment associated with the fume hood. These are just example fume hood parameters. A controller 42 is operatively coupled to the user interface 30, the wireless interface 36 and the memory 38.

Figure 3:
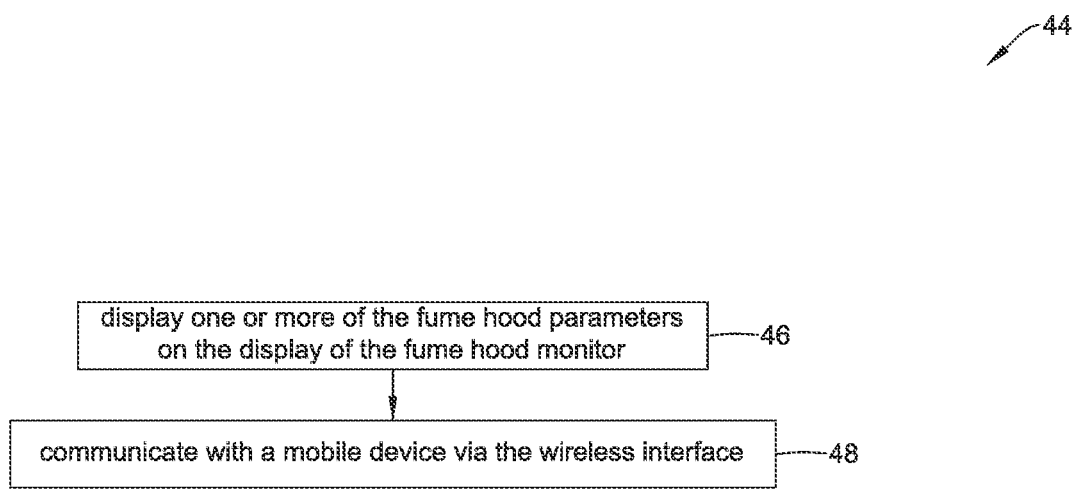
FIG. 3 is a flow diagram showing an illustrative series of steps that a controller forming part of the illustrative fume hood monitor of FIG. 2 may carry out.

FIG. 3 is a flow diagram showing an illustrative series of steps 44 that may be carried out by the controller 42 of the fume hood monitor 26 of FIG. 2. In some cases, the controller 42 may be configured to display one or more of the fume hood parameters on the display 32 of the fume hood monitor 26, as indicated at block 46. In some cases, the controller 42 may be configured to communicate with the mobile device 28 via the wireless interface 36.

Figure 4:
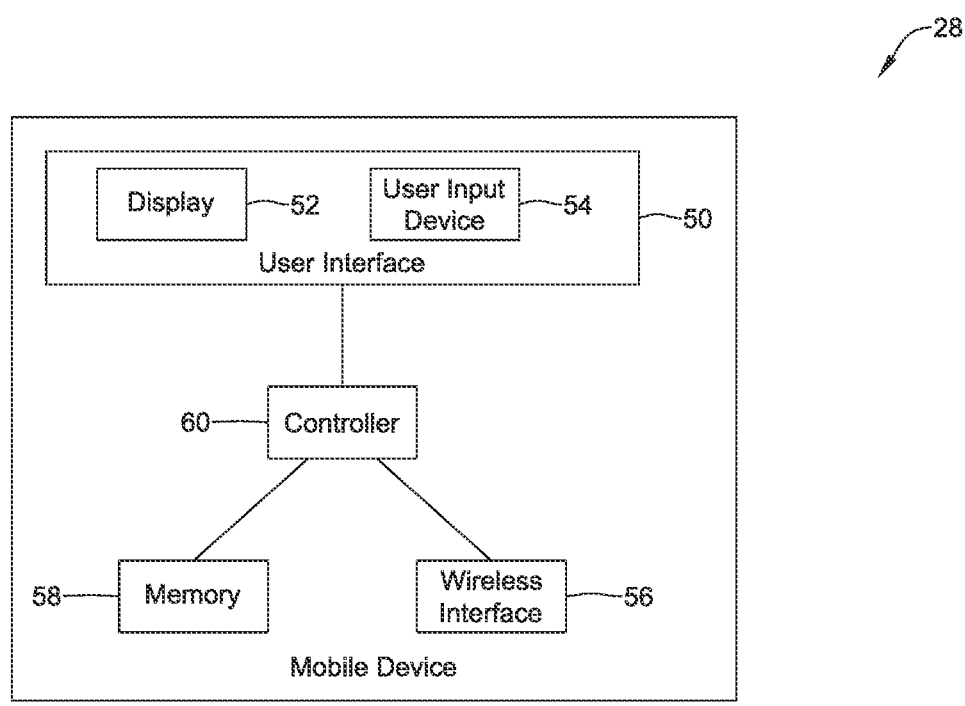
FIG. 4 is a schematic block diagram of an illustrative mobile device forming a portion of the illustrative fume hood system of FIG. 1.

FIG. 4 is a schematic block diagram of the mobile device 28 of FIG. 1. The mobile device 28 may include a user interface 50 that itself includes a display 52 and a user input device 54. In some instances, the user interface 50 may include a touchscreen display that functions as both the display 52 and the user input device 54. In some instances, the display 52 and the user input device 54 may be separate, such as when the user input device 54 includes a keypad that a user can enter information on. The illustrative mobile device 28 includes a wireless interface 56 that may be used to communicate with other devices, such as but not limited to the fume hood monitor 26 of FIG. 1. The mobile device 28 includes a memory 58. A controller 60 is operatively coupled to the user interface 50, the wireless interface 56 and the memory 58.

Figure 5A:
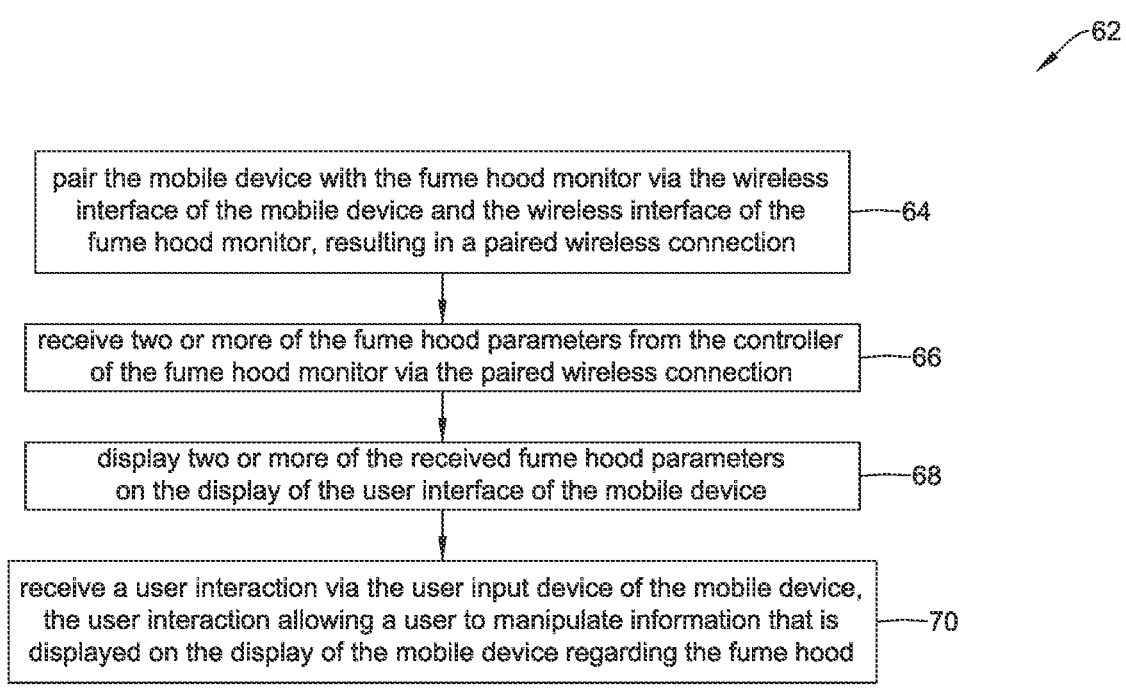
FIG. 5A is a flow diagram showing an illustrative series of steps that a controller forming part of the illustrative mobile device of FIG. 4 may carry out.

FIG. 5A is a flow diagram showing an illustrative series of steps 62 that may be carried out by the controller 60 of the mobile device 28 of FIG. 4. In some instances, the controller 60 may be configured to pair the mobile device 28 with the fume hood monitor 26 via the wireless interface 56 of the mobile device 28 and the wireless interface 36 of the fume hood monitor 26, resulting in a paired wireless connection, as indicated at block 64. The pair wireless connection may be a Bluetooth wireless connection, a WIFI wireless connection and/or any other suitable wireless connection. In some instances, the controller 60 of the mobile device 28 may be configured to receive two or more of the fume hood parameters 40 from the controller 42 of the fume hood monitor 26 via the paired wireless connection, as indicated at block 66. The controller 60 may be configured to display two or more of the received fume hood parameters 40 on the display 52 of the user interface 50 of the mobile device 28, as indicated at block 68. In some cases, the particular fume hood parameters 40 that are displayed, the format of the fume hood parameters 40 that are displayed and/or the layout of the fume hood parameters 40 that are displayed on the mobile device 28 may be personalized by the mobile device 28 to accommodate the particular user associated with the mobile device 28. In some cases, an application program running on the mobile device 28 may facilitate the particular user of the mobile device to personalize the selection and display of fume hood parameters 40 on the display 52.

In some instances, the controller 60 of the mobile device 28 may be configured to receive a user interaction via the user input device 54 of the mobile device 28. The user interaction may allow a user of the mobile device 28 to manipulate information that is displayed on the display 52 of the mobile device 28 regarding the fume hood 12. In some instances, the user interaction received via the user input device 54 of the mobile device 28 includes acknowledging one or more alarms associated with one or more of the received fume hood parameters 40. In some instances, the user interaction received via the user input device 54 of the mobile device 28 includes altering one or more of the received fume hood parameters 40, after which the controller 60 of the mobile device 28 is configured to send the altered one or more of the received fume hood parameters to the fume hood monitor 26 via the paired wireless connection for use by the fume hood monitor 26 during subsequent operation of the fume hood 12.

In some instances, the user interaction received via the user input device 54 of the mobile device 28 includes setting one or more first display settings that control which of the two or more received fume hood parameters 40 are displayed on the display 52 of the mobile device 28. In some instances, the user interaction received via the user input device 54 of the mobile device 28 includes setting one or more second display settings that control a display format for one or more of the received fume hood parameters 40 that are displayed on the display 52 of the mobile device 28.

In some instances, the user interaction received via the user input device 54 of the mobile device 28 includes setting up one or more timers for one or more experiments associated with the fume hood 12. In some instances, the user interaction received via the user input device 54 of the mobile device 28 includes setting up one or more experiments associated with the fume hood. As an example, setting up one or more experiments may include setting up one or more steps for each of the one or more experiments and one or more timers associated with at least one of the one or more steps.

Figure 5B:
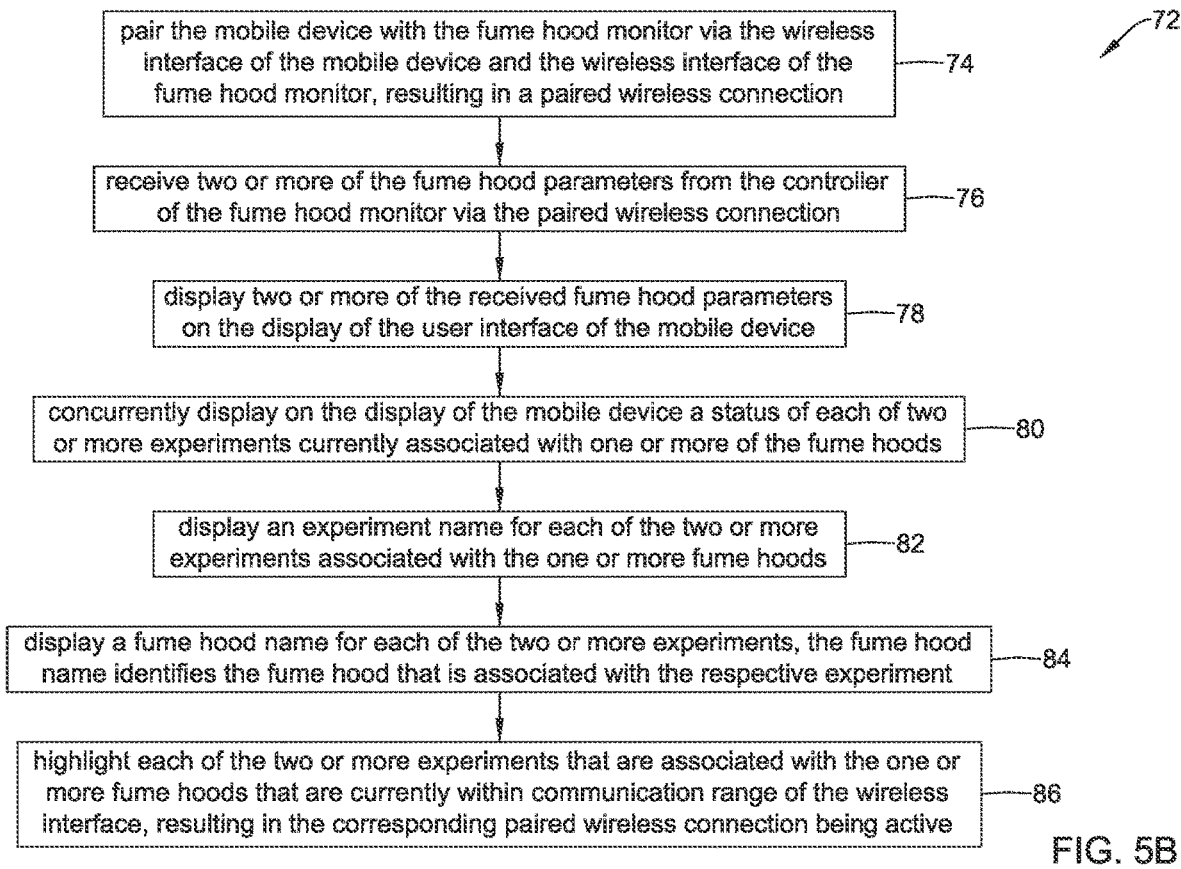
FIG. 5B is a flow diagram showing an illustrative series of steps that a controller forming part of the illustrative mobile device of FIG. 4 may carry out.

FIG. 5B is a flow diagram showing an illustrative series of steps 72 that may be carried out by the controller 60 of the mobile device 28. In some instances, the controller 60 may be configured to pair the mobile device 28 with the fume hood monitor 26 via the wireless interface 56 of the mobile device 28 and the wireless interface 36 of the fume hood monitor 26, resulting in a paired wireless connection, as indicated at block 74. In some instances, the controller 60 may be configured to receive two or more of the fume hood parameters 40 from the controller 42 of the fume hood monitor 26 via the paired wireless connection, as indicated at block 76. The controller 60 may be configured to display two or more of the received fume hood parameters 40 on the display 52 of the user interface 50 of the mobile device 28, as indicated at block 78.

In some instances, the controller 60 of the mobile device 28 may be configured to concurrently display on the display 52 of the mobile device 28 a status of each of two or more experiments currently associated with one or more of the fume hoods, as indicated at block 80. As an example, the status of at least one of the two or more experiments associated with one or more fume hoods may include one or more of a timer status and an alarm status. As another example, the timer status may include a time remaining indicator for the corresponding experiment.

In some instances, the controller 60 may be configured to display an experiment name for each of the two or more experiments associated with the one or more fume hoods, as indicated at block 82. In some cases, the two or more experiments may be associated with two or more different fume hoods. In some instances, the controller 60 may be configured to display a fume hood name for each of the two or more experiments, where the fume hood name identifies the fume hood that is associated with the respective experiment, as indicated at block 84. In some instances, the controller 60 may be configured to highlight each of the two or more experiments that are associated with the one or more fume hoods that are currently within communication range of the wireless interface 56 (resulting in the corresponding paired wireless connection being active), as indicated at block 86.

Figure 6A:
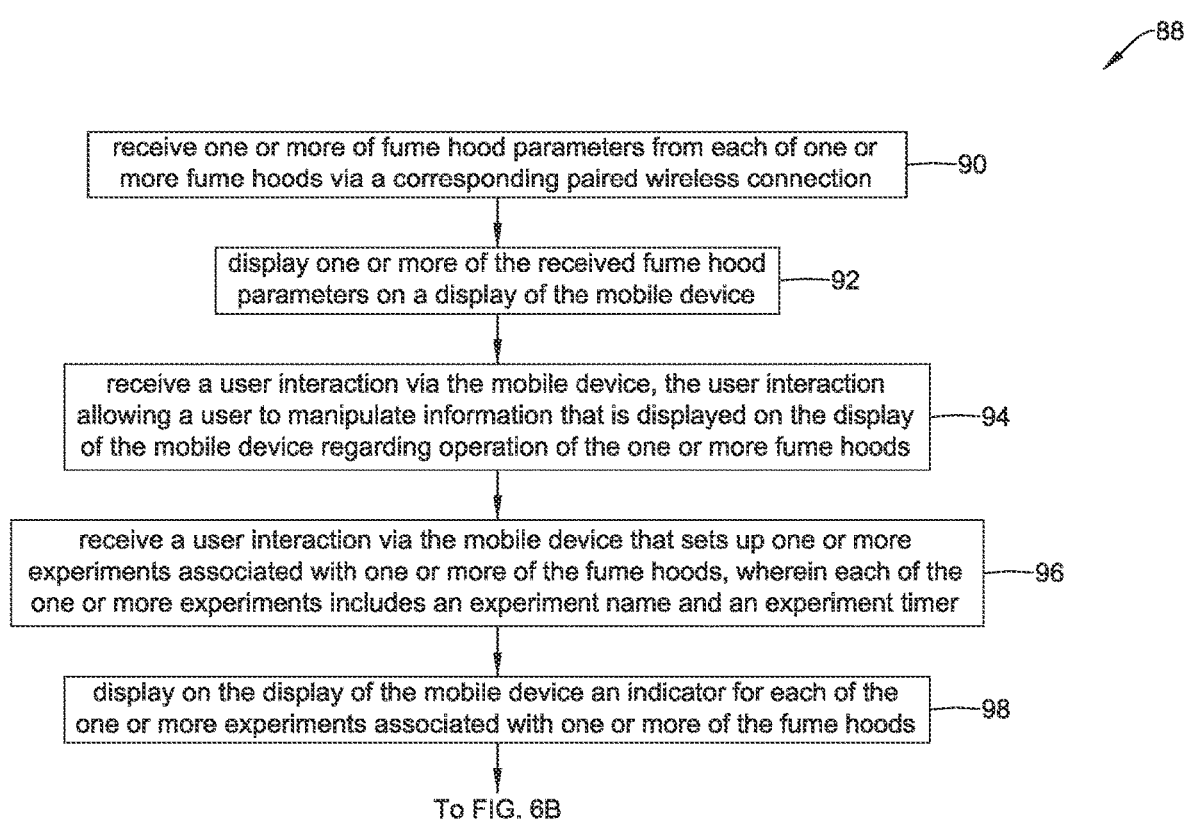
FIGS. 6A and 6B are flow diagrams that together show an illustrative series of steps that one or more processors of the illustrative mobile device of FIG. 4 may carry out when executing executable instructions.
Figure 6B:
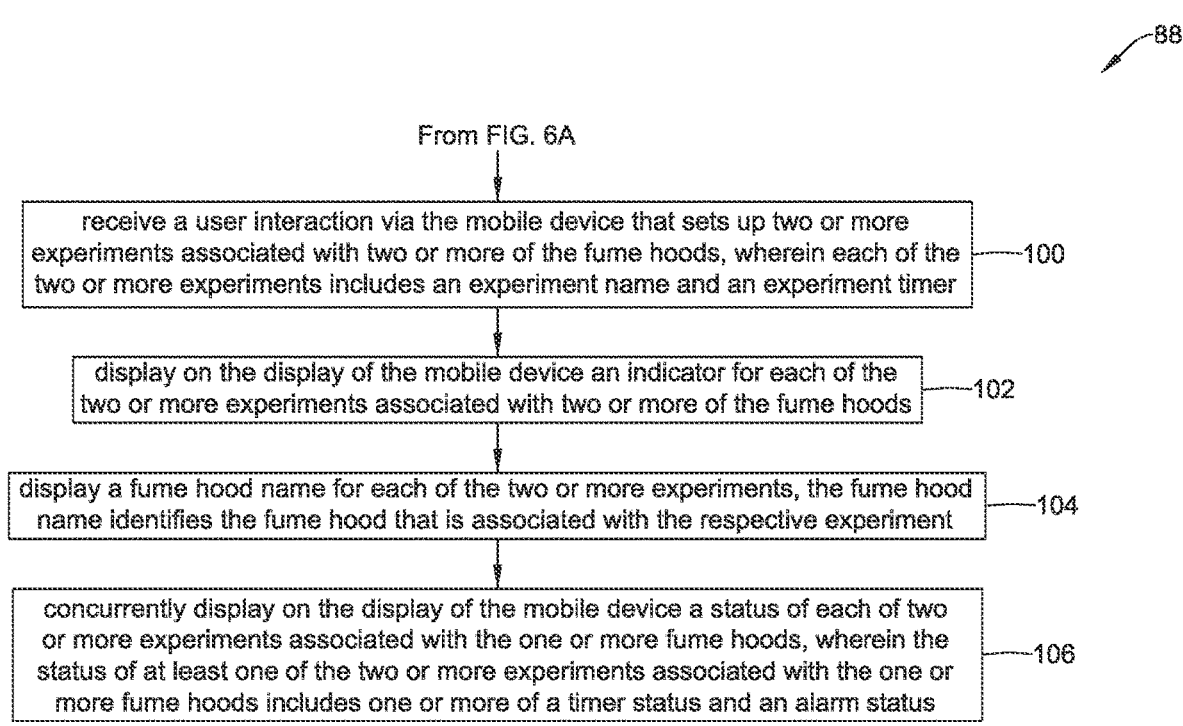

FIGS. 6A and 6B are flow diagrams that together show an illustrative series of steps 88 that may be carried out by one or more processors of the mobile device 28. The one or more processors may be considered as being part of the controller 60, for example. The one or more processors may be caused to receive one or more fume hood parameters from each of one or more fume hoods via a corresponding paired wireless connection, as indicated at block 90. The one or more processors may be caused to display one or more of the received fume hood parameters on a display 52 of the mobile device 28, as indicated at block 92. The one or more processors may be caused to receive a user interaction via the mobile device 28, wherein the user interaction allows a user to manipulate information that is displayed on the display 52 of the mobile device 28 regarding operation of the one or more fume hoods, as indicated at block 94. Manipulating information may include, for example, identifying which of the one or more fume hood parameters to display, identify a display format for one or more fume hood parameters on the display, selecting a menu or the like to display additional information regarding one or more of the fume hood parameters, setting a value of one or more of the fume hood parameters, and changing a value of one or more of the fume hood parameters. These are just examples.

The one or more processors may be caused to receive a user interaction via the mobile device 28 that manipulates information by setting up one or more experiments associated with one or more of the fume hoods, wherein each of the one or more experiments includes an experiment name and an experiment timer, as indicated at block 96. The one or more processors may be caused to display on the display 52 of the mobile device 28 an indicator for each of the one or more experiments associated with one or more of the fume hoods, as indicated at block 98.

The series of steps 88 continues on FIG. 6B. In some instances, the one or more processors may be caused to receive a user interaction via the mobile device 28 that manipulates information by setting up two or more experiments associated with two or more of the fume hoods, wherein each of the two or more experiments includes an experiment name and an experiment timer, as indicated at block 100. In some instances, the one or more processors may be caused to display on the display 52 of the mobile device 28 an indicator for each of the two or more experiments associated with two or more of the fume hoods, as indicated at block 102. In some instances, the one or more processors may be caused to display a fume hood name for each of the two or more experiments, the fume hood name identifies the fume hood that is associated with the respective experiment, as indicated at block 104. In some instances, the one or more processors may be caused to concurrently display on the display 52 of the mobile device 28 a status of each of two or more experiments associated with the one or more fume hoods, wherein the status of at least one of the two or more experiments associated with the one or more fume hoods includes one or more of a timer status and an alarm status, as indicated at block 106.

Figure 7A:
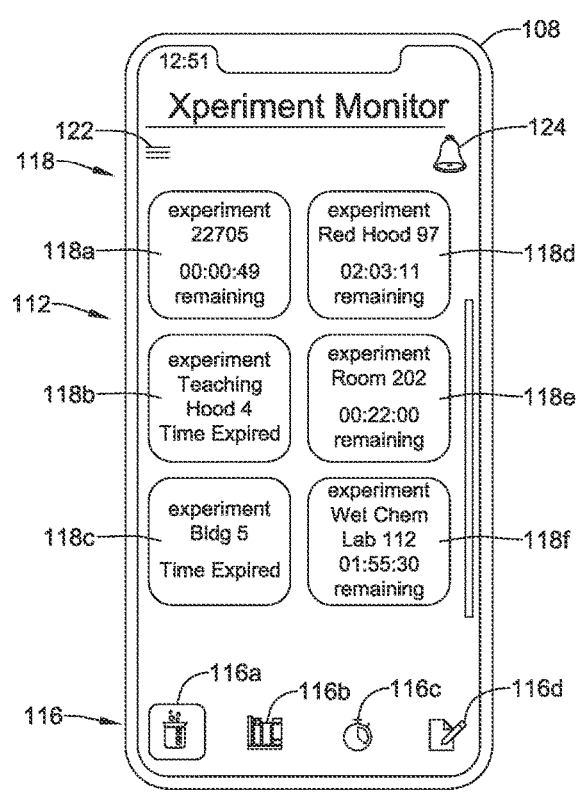
Figure 7B:
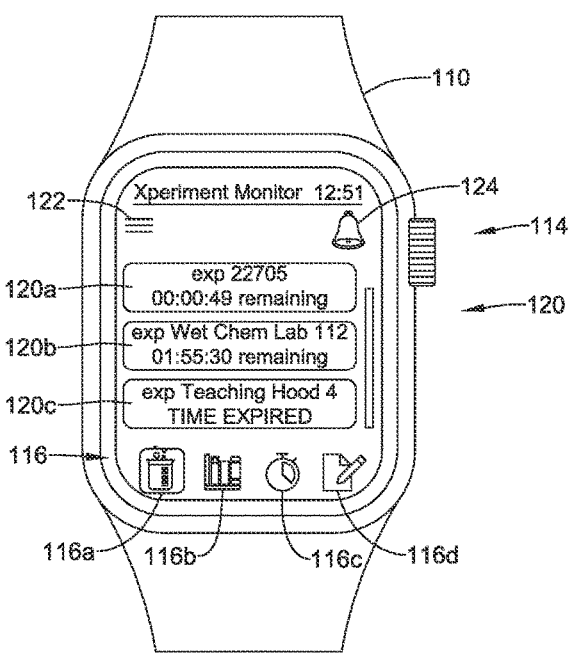
FIG. 7B is a screen shot of a corresponding screen that may be displayed on a smartwatch.

As described herein, the fume hood monitor 26 is able to communicate with the mobile device 28, and the mobile device 28 is configured to receive information from the fume hood monitor 26 and to display some or all of this information on the display 52 of the mobile device 28. In some cases, the mobile device 28 is configured to communicate information back to the fume hood monitor 26. FIG. 7A shows a smartphone 108 and FIG. 7B shows a smartwatch 110. The smartphone 108 and the smartwatch 110 may each be considered to be examples of the mobile device 28. The smartphone 108 shows a screen 112 while the smartwatch 110 shows a screen 114 that has been adjusted for the smaller display of the smartwatch 110.

In FIG. 7A, the screen 112 includes a toolbar 116 that includes an experiments overview icon 116*a*, a historical data icon 116*b*, an experimental timer icon 116*c* and a new experiment icon 116*d*. As can be seen in FIG. 7B, the screen 114 includes the same toolbar 116. The screen 112 includes a number of icons 118 that each show information for a particular fume hood or a particular experiment. The icons 118 include an icon 118*a*, an icon 118*b*, an icon 118*c*, an icon 118*d*, an icon 118*e* and an icon 118*f*. Each of the icons 118 include timer information for a particular fume hood or a particular experiment. As an example, the icon 118*a* shows that experiment #22705 has 49 seconds remaining. The icon 118*b* shows that the timer has expired for Teaching Hood 4. The screen 114 includes several icons 120 that mirror the information shown in some of the icons 120. For example, the screen 114 includes an icon 120*a*, an icon 120*b* and an icon 120*c*. The icon 120*a* mirrors the information shown in the icon 118*a*, and reports that experiment #22705 has 49 seconds remaining. The icon 120*c* mirrors the information shown in the icon 118*b*, i.e., that the timer has expired for Teaching Hood 4.

The screen 112 includes a settings button 122 that may be selected to chose various options. The settings button 122 is mirrored on the screen 114. An alarms icon 124 (not illuminated) is seen in both the screen 112 and the screen 114. If an alarm occurs, the alarms icon 124 will be highlighted. As will be discussed, in some instances, a user can acknowledge an alarm from either the screen 112 (on the smartphone 108) or the screen 114 (on the smartwatch 110). The alarm acknowledgement may be communicated back to the fume hood monitor that is associated with the alarm.

Figure 8A:
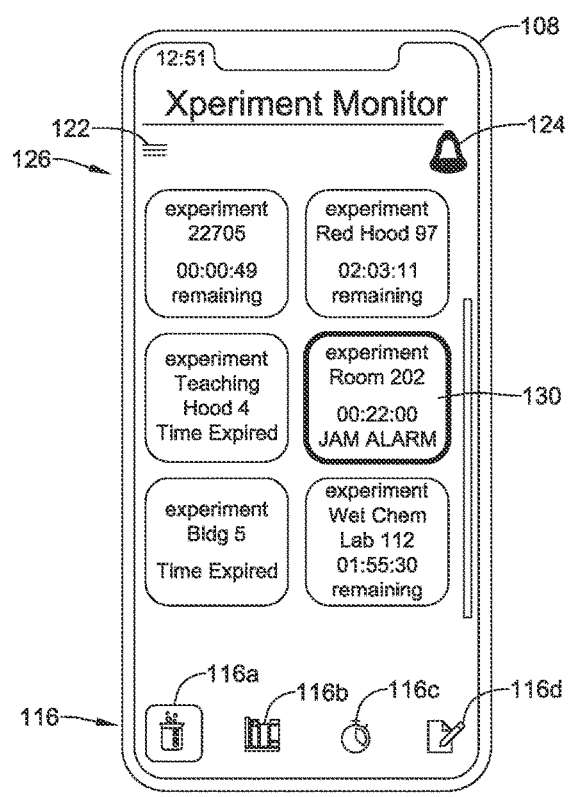
Figure 8B:
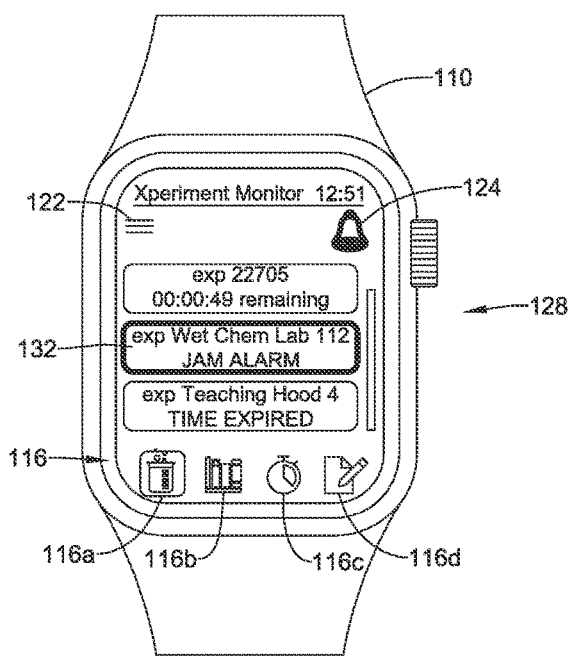
FIG. 8B is a screen shot of a corresponding screen that may be displayed on a smartwatch.

FIG. 8A shows a screen 126 on the smartphone 108 and FIG. 8B shows a corresponding screen 128 on the smartwatch 110 in which the alarms icon 124 has been illuminated, indicating that the fume hood monitor 26 is currently reporting one or more alarms. As seen on the screen 126, an icon 130 indicates that a JAM ALARM has occurred in experiment room #202. A similar icon 132 on the screen 128 shows a similar alarm, but for Wet Chem Lab 112.

Figure 9A:
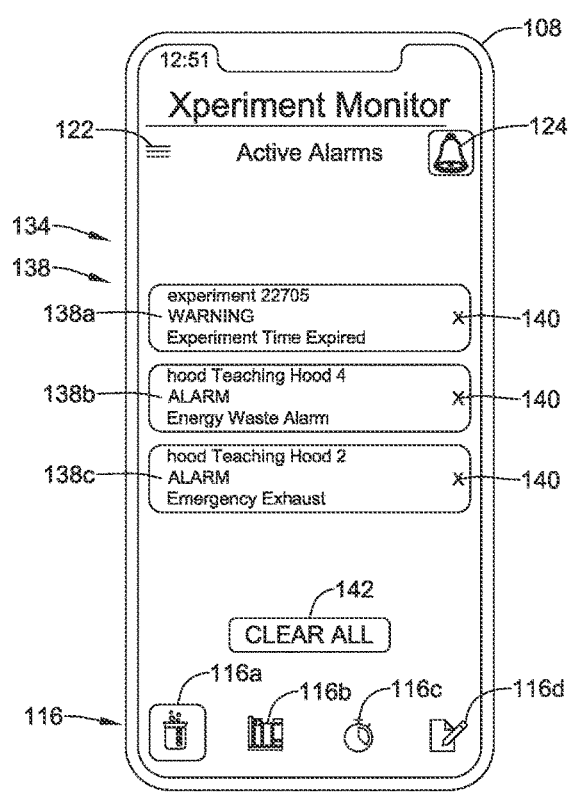
Figure 9B:
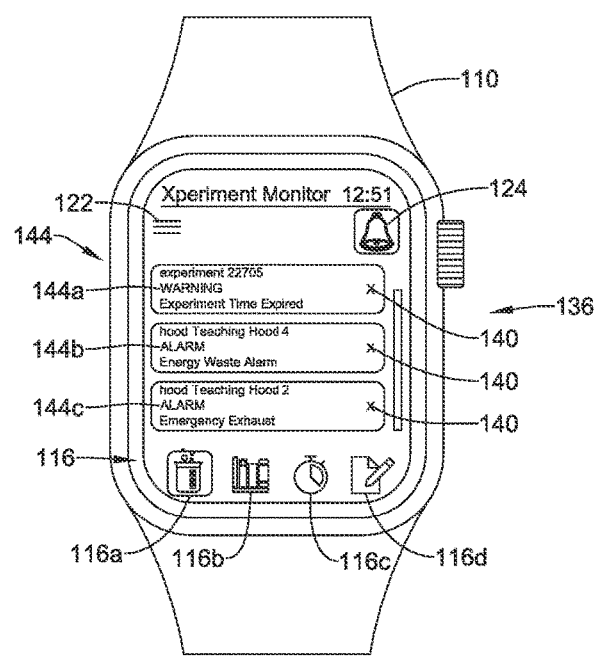
FIG. 9B is a screen shot of a corresponding screen that may be displayed on a smartwatch.

FIG. 9A shows a screen 134 on the smartphone 108 and FIG. 9B shows a corresponding screen 136 on the smartwatch 110 in which the user has selected the alarms icon 124 in order to view current alarms. As can be seen, the alarms icon 124 remains illuminated. The screen 134 includes several icons 138, including an icon 138*a* indicating that the experiment timer has expired on experiment #22705, an icon 138*b* indicating an energy waste alarm in Teaching Hood 4, and an icon 138*c* indicating an emergency exhaust alarm in Teaching Hood 2. In some cases, different colors may be used to indicate different alarm severity levels, such as yellow for a medium priority alarm and red for a high priority alarm, for example.

Each of the icons 138 include an "x" 140 that may be selected to acknowledge a particular alarm. The screen 134 also includes a CLEAR ALL button 142 that may be used to simultaneously clear and in some cases acknowledge all of the current alarms. In FIG. 9B, the screen 136 includes several icons 144, including an icon 144*a* indicating that the experiment timer has expired on experiment #22705, an icon 144*b* indicating an energy waste alarm in Teaching Hood 4, and an icon 144*c* indicating an emergency exhaust alarm in Teaching Hood 2. Each of the icons 144 include the "x" 140 that may be selected by the user to acknowledge a particular alarm.

Figure 10A:
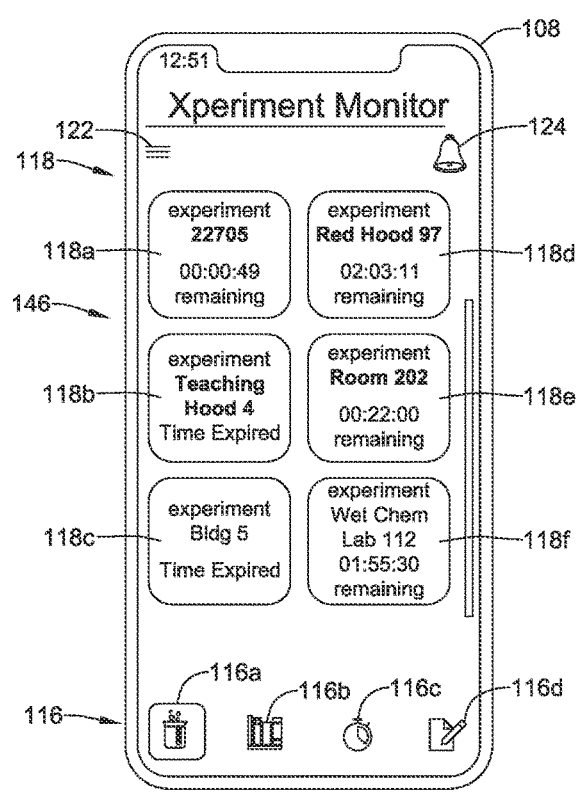

In some instances, the information displayed by the smartphone 108 or the smartwatch 110 may change, depending on which fume hoods, or more accurately, which fume hood monitors 26, are within range of the smartphone 108 or the smartwatch 110. FIG. 10A shows a screen 146 that is similar to the screen 112 shown in FIG. 7A, but some of the icons 118 are now illuminated or highlighted in order to show which experiments are physically nearby. In some instances, this may indicate that the smartphone 108 is within Bluetooth range of the particular fume hoods. In particular, icon 118*a* has illuminated to show that the experiment 22705 is nearby (e.g. within Bluetooth range), the icon 118*b* has illuminated to show that the Teaching Hood 4 is nearby, the icon 118*d* has illuminated to show that the Red Hood 97 is nearby, and the icon 118*e* has illuminated to show that the experiment in Room 202 is nearby. In the example shown, the experiments on Bldg 5 and Wet Chem Lab 112 are not nearby (e.g. not currently within Bluetooth range), and are thus not highlighted and in some cases grayed out.

Figure 10B:
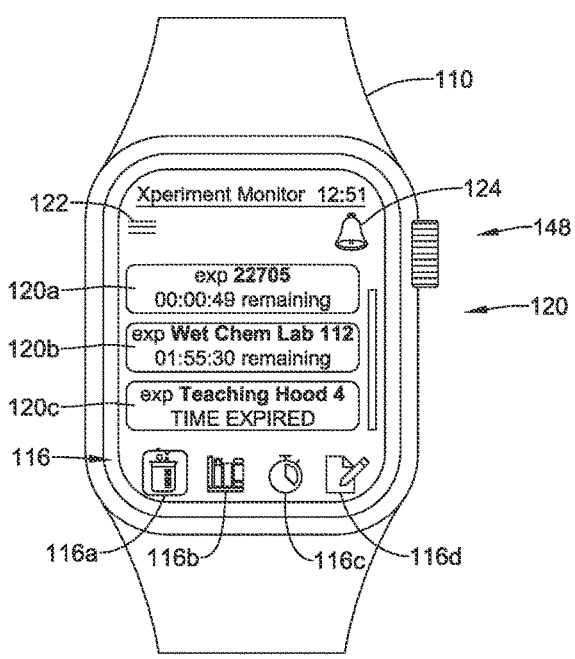
FIG. 10B is a screen shot of a corresponding screen that may be displayed on a smartwatch.

FIG. 10B shows a screen 148 that is similar to the screen 114 shown in FIG. 7B, but the icons 120 are now illuminated or highlighted to show which experiments are physically nearby. In some instances, this may indicate that the smartwatch 110 is within Bluetooth range of the particular range hoods. In particular, icon 120*a* has illuminated to show that the experiment 22705 is nearby, the icon 120*b* has illuminated to show that the Wet Chem Lab 112 is nearby, and the icon 120*c* has been illuminated to show that the Teaching Hood 4 is nearby. It will be appreciated that the screen 148 includes icons that are not visible on the screen 146. These icons may be viewed by scrolling up/down using the scroll features of the smartwatch 110.

Figure 11A:
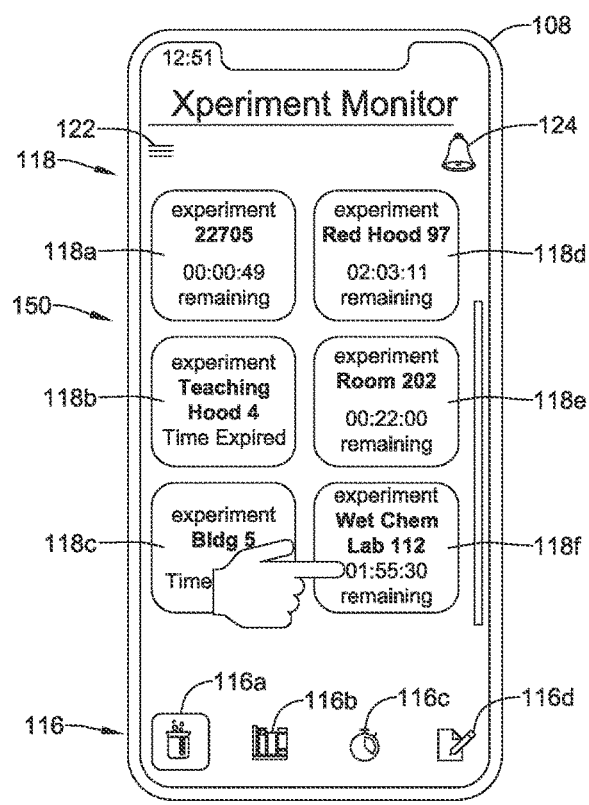
Figure 11B:
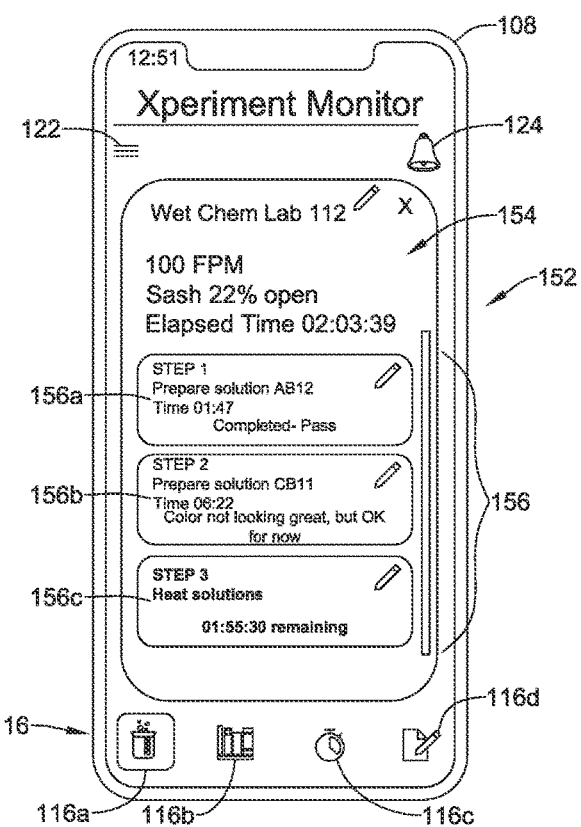

FIG. 11A shows a screen 150 that is similar to the screen 146 shown in FIG. 10A, but shows selection of the icon 118*f* by the user. In some instances, selecting the icon 118*f* may cause additional information to be displayed regarding the experiment referenced by the icon 118*f*, including information such as experiment name, steps completed, steps remaining and fume hood data such as face velocity and sash opening percentage. It will be appreciated that while selection of the icon 118*f* is shown, similar results may occur when selecting any of the icons 118. Selecting the icon 118*f* will cause a screen 152 to be displayed, as seen for example in FIG. 11B. The screen 152 displays a title Wet Chem Lab 112, which corresponds to that shown in the icon 118*f*. A first section 154 provides fume hood data, indicating a current face velocity of 100 FPM (feet per minute), that the sash is 22 percent open and that the current experiment has been running for 2 hours, 3 minutes and 39 seconds. A second section 156 shows details of the experiment, step by step. Steps 156a and 156b are shown to have been completed, and step 156c is currently underway. In some cases, each step may include a description of the step. For example, step 1 includes a description of "Prepare solution AB12". Moreover, and in some cases, notes may be added by the user for each step. A note may be added by selecting the pencil icon associated with the step, and entering the desired note. For example, a note of "Color not looking great, but OK for now" has been entered by the user of the smartphone 108 for step 156b.

Figure 11C:
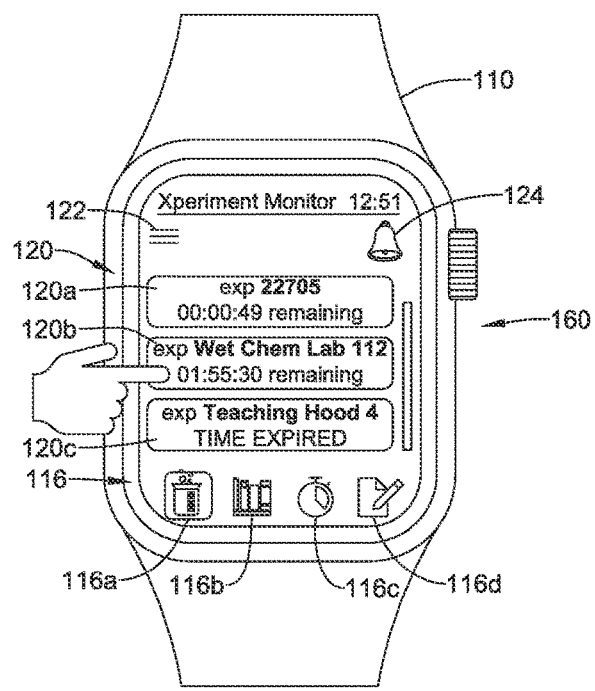
FIGS. 11C and 11D are screen shots of corresponding screens that may be displayed on a smartwatch.
Figure 11D:
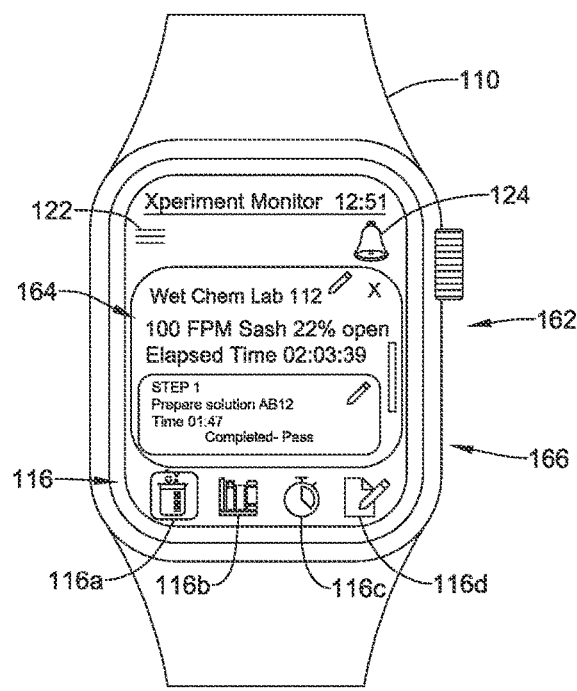

FIG. 11C shows a screen 160 that is similar to the screen 148 shown in FIG. 10B, but shows selection of the icon 120b. In some instances, selecting the icon 120b may cause additional information to be displayed regarding the experiment referenced by the icon 120b, including information such as experiment name, steps completed, steps remaining and fume hood data such as face velocity and sash opening percentage. It will be appreciated that while selection of the icon 120b is shown, similar results may occur when selecting any of the icons 120. Selecting the icon 120b will cause a screen 162 to be displayed, as seen for example in FIG. 11D. The screen 162 displays a title Wet Chem Lab 112, which corresponds to that shown in the icon 120b. A first section 164 provides fume hood data, indicating a current face velocity of 100 FPM (feet per minute), that the sash is 22 percent open and that the current experiment has been running for 2 hours, 3 minutes and 39 seconds. A second section 166 allows the user to scroll through the steps of the experiment, step by step.

Figure 12A:
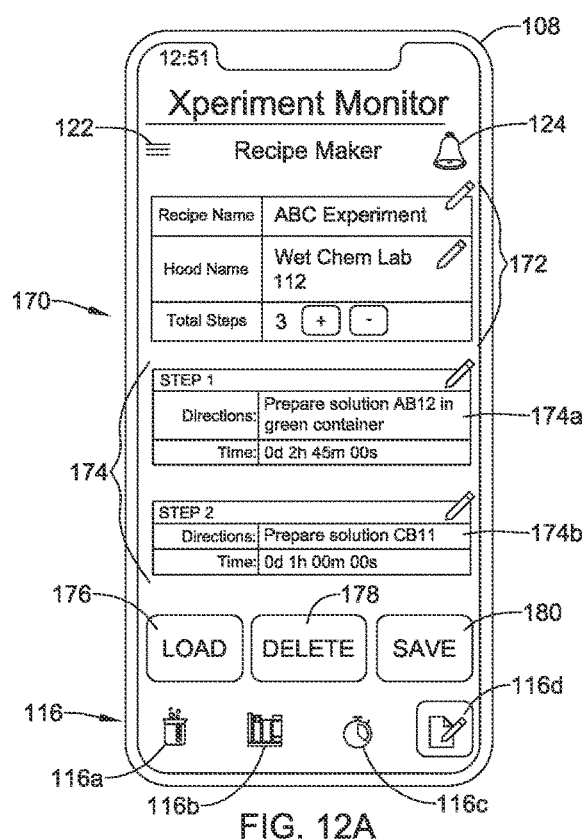

In some instances, the user can use their smartphone 108 or their smartwatch 110 (as examples of the mobile device 28) to create experiments, sometimes referred to as "recipes" or to recall previously saved "recipes" saved as templates that can be used as-is or modified. FIG. 12A shows a screen 170 that includes a first section 172 that displays a name of a recipe, in this case ABC Experiment, the name of the fume hood, in this case Wet Chem Lab 112, and the total number of steps in the experiment, in this case a total of three steps. A section 174 includes the steps, including a first step 174a and a second step 174b. A third step, 174c, is not visible in this view, and may be reached by scrolling through the section 174. The screen 170 includes a LOAD button 176, a DELETE button 178 and a SAVE button 180 that may be used, respectively, to load an experiment, to delete an experiment and to save an experiment.

Figure 12B:
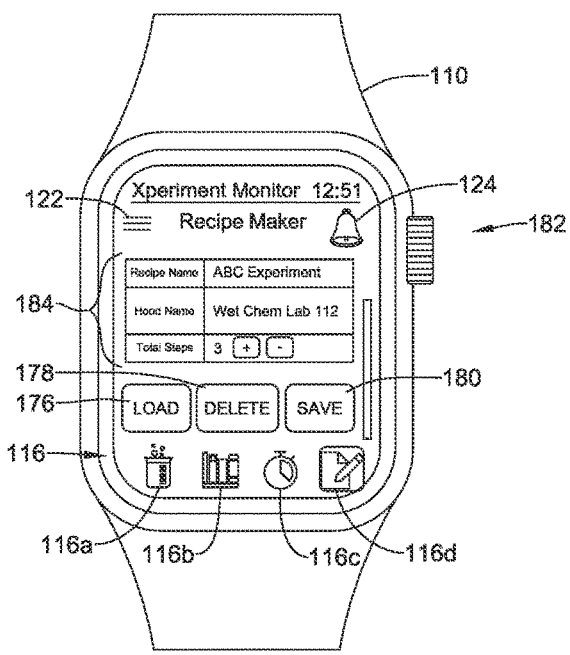
FIG. 12B is a screen shot of a corresponding screen that may be displayed on a smartwatch.

FIG. 12B shows a screen 182 that is similar to the screen 170, but that has been modified for the smaller display of the smartwatch 110. The screen 182 includes a first section 184 that displays a name of a recipe, in this case ABC Experiment, the name of the fume hood, in this case Wet Chem Lab 112, and the total number of steps in the experiment, in this case a total of three steps. By scrolling, the user is able to view the details of each step (as seen for example in the screen 170 shown in FIG. 12A).

Figure 13A:
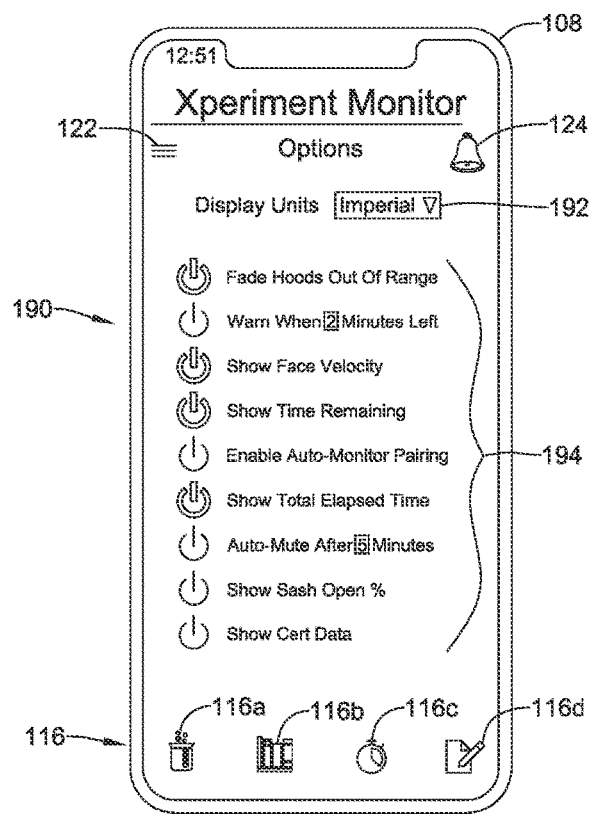
FIGS. 13A, 13B and 13C are screen shots of illustrative screens that may be displayed on a smartphone.
Figure 13B:
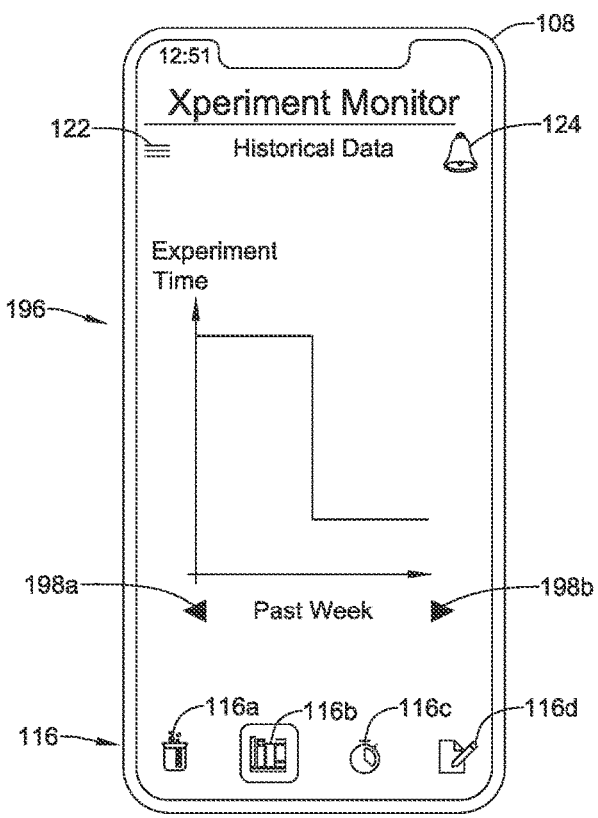
Figure 13C:
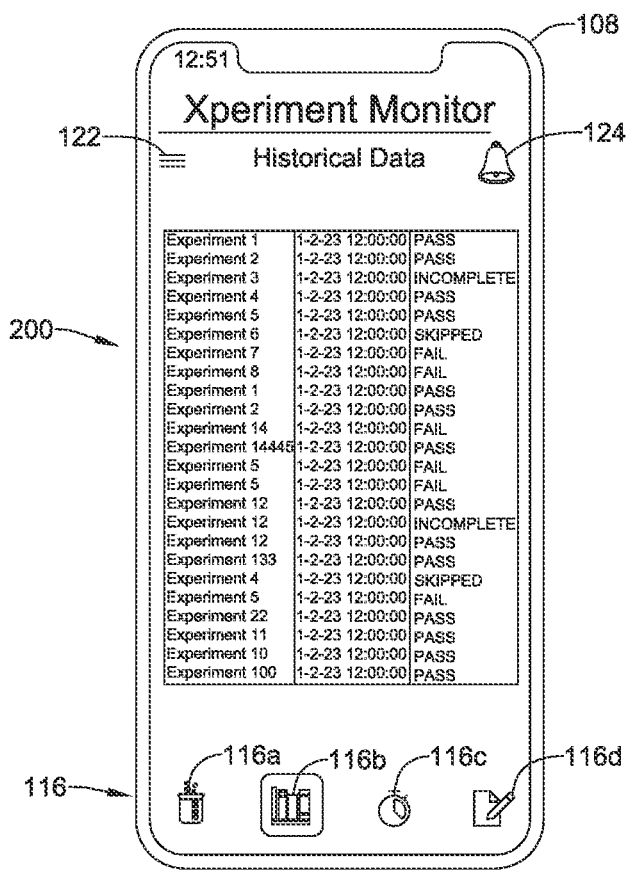

FIGS. 13A, 13B and 13C provide additional examples of screens that may be displayed by the smartphone 108 in communication with the fume hood monitor 26. FIG. 13A shows a screen 190 that allows a user to choose various options regarding which information and/or how the information is to be displayed. The screen 190 includes a pull-down menu 192 that allows a user to specify display units. While not explicitly shown, a pull-down menu may be provided to allow a user to select a desired natural language for use on the display (e.g. English, Chinese, German). A second 194 includes a number of options that the user can choose between. As can be seen, some of the options are highlighted, meaning that they have been selected, and some of the options are not highlighted, meaning that they have not been selected. For example, the user has chosen to fade fume hoods that are out of range (e.g. out of Bluetooth range as discussed with respect to FIGS. 10A-10B), to show face velocity, to show time remaining and to show total elapsed time. The user has chosen not to warn when limited time remains, to enable auto-monitor pairing, to auto-mute, to show sash open percentage or to show certification data. This facilitates the user in personalizing what information is displayed and/or how the information is displayed.

FIG. 13B includes a screen 196 showing a graphical representation of historical data. In some instances, the screen 196 may be displayed in response to the user selecting the historical data icon 116b. In some instances, as shown, the screen 196 may include scroll buttons 198a and 198b that may be used to change the time period for the displayed historical data. FIG. 13C shows a screen 200 that provides a tabular version of historical data, including a listing of which experiments have been completed successfully, which experiments have failed and which were either not finished or were skipped.

In some instances, the mobile device 28 (such as the smartphone 108 or the smartwatch 110) may be configured to provide any of a variety of different functions related to the operation of the fume hood. Some of these functions are outlined in the table below:

| Feature | Description |
| --- | --- |
| Experiment Timer | Multiple separate stopwatch timers for experiments that the user can name and see on screen simultaneously |
| Experiment Countdown | Multiple separate countdown alarms for experiments that the user can name and see on screen, with reminder warning time (for example, user sets experiment alarm for 1 hour, and 5 minutes before as a reminder) |
| Experiment Details | Experiment notes can be kept on the application |
| Last At Fume Hood | Keeps track of the last time the user was at the fume hood (can display as Time of Day or elapsed time) |
| Time At Fume Hood | Keeps track of total time at the fume hood, can be reset by user |
| Configurable Display | User decides which fume hood parameters to display on application main view page and/or can auto rotate through the fume hood parameters one at a time |
| Configurable Style | User can choose from a variety of fonts and colors for the application main view page |
| Face Velocity | Face velocity displayed in current units (ft/min, m/s, etc.) based on location, user can override and select units |

-continued

| Feature | Description |
| --- | --- |
| Alarm | Application can display multiple alarms, if the fume hood monitor is in an alarm condition (broken sash, low flow, etc.), they will be shown on the application screen. User can choose alarm sounds |
| Alarm Mute | If supported by the fume hood monitor, user can mute alarms using the application |
| End Setback (e.g. operator detection) | As user approaches a fume hood, the fume hood monitor can be configured to take hood out of setback mode (e.g. out of low face velocity) if supported by the Fume Hood and Fume Hood air flow valve. |
| Sash Position | Can display the fume hood sash percentage open |
| Certification Data | Can display the certification data for the fume hood |
| Other fume hood data | Can show some fume hood parameters for fume hoods not currently in range, such as time remaining on an experiment, certification data, etc. |
| Pair with FHM | Searches for other wireless devices, to pair with a wireless-compatible fume hood monitor |
| Selecting other units | User can choose display units for all fume hood parameters |
| Misc Fume Hood Data | Other data that is displayed on a fume hood monitor can be shown on the main view of the smartphone or smartwatch application |

Having thus described several illustrative embodiments of the present disclosure, those of skill in the art will readily appreciate that yet other embodiments may be made and used within the scope of the claims hereto attached.

What is claimed is:

1. A fume hood system comprising:
a fume hood including a fume hood monitor, the fume hood monitor including:
 a user interface including a display and a user input device;
 a wireless interface;
 a memory for storing a plurality of fume hood parameters associated with the fume hood;
 a controller operatively coupled to the user interface, the wireless interface and the memory of the fume hood monitor, the controller of the fume hood monitor configured to:
  display one or more of the fume hood parameters on the display of the fume hood monitor;
  communicate with a mobile device via the wireless interface;
the mobile device including:
 a user interface including a display and a user input device;
 a wireless interface;
 a memory;
 a controller operatively coupled to the user interface, the wireless interface and the memory of the mobile device, the controller of the mobile device executing a mobile application program that is configured to:
  pair the mobile device with the fume hood monitor via the wireless interface of the mobile device and the wireless interface of the fume hood monitor, resulting in a paired wireless connection;
  receive two or more of the fume hood parameters from the controller of the fume hood monitor via the paired wireless connection;
  display two or more of the received fume hood parameters on the display of the user interface of the mobile device;
  receive a user interaction entered by a user of the mobile device via the user input device of the mobile device, the user interaction including the user of the mobile device selecting one or more of a plurality of predetermined mobile application program settings that cause the mobile application program to personalize the display of information received from the controller of the fume hood for the particular user on the mobile device; and
  personalize the display of information that is received from the controller of the fume hood on the display of the mobile device based at least in part on the selected one or more of the plurality of predetermined mobile application program settings selected by the particular user of the mobile device.

2. The fume hood system of claim 1, wherein one of the plurality of predetermined mobile application program settings, when selected, cause the mobile application program to display a value of a designated one of the plurality of fume hood parameters received from the controller of the fume hood on the mobile device, and when not selected, not display the value of the designated one of the plurality of fume hood parameters on the mobile device.

3. The fume hood system of claim 1, wherein one of the plurality of predetermined mobile application program settings, when selected, cause the mobile application program to display a time remaining of a timer that is associated with the fume hood on the mobile device.

4. The fume hood system of claim 1, wherein at least some of the plurality of predetermined mobile application program settings define a personalized experiment, wherein a first one of the plurality of predetermined mobile application program settings define a personalized name of the personalized experiment, a second one of the plurality of predetermined mobile application program settings define a number of steps of the personalized experiment, and a third one of the plurality of predetermined mobile application program settings define a timer for a corresponding one of the number of steps of the personalized experiment, wherein the personalized name and the timer are displayed on the display of the mobile device when monitoring the step of the personalized experiment using the mobile device.

5. The fume hood system of claim 1, wherein one of the plurality of predetermined mobile application program settings, when selected, causes the mobile application program to display one or more of the received fume hood parameters that are displayed on the display of the mobile device in a designated color, font and/or unit of measure.

6. The fume hood system of claim 1, wherein at least some of the plurality of predetermined mobile application program settings define a personalized experiment, wherein one of the plurality of predetermined mobile application program settings define a personalized name of the personalized experiment, wherein the personalized name is displayed on the display of the mobile device when monitoring the personalized experiment using the mobile device.

7. The fume hood system of claim 1, wherein at least some of the plurality of predetermined mobile application program settings define a personalized experiment, wherein one of the plurality of predetermined mobile application program settings define a timer for a step of the personalized experiment, wherein the timer is associated with the step of the personalized experiment, and wherein the timer is displayed on the display of the mobile device when monitoring the step of the personalized experiment using the mobile device.

8. The fume hood system of claim 1, wherein at least some of the plurality of predetermined mobile application program settings define a personalized experiment, wherein a first one of the plurality of predetermined mobile application program settings define a step of the personalized experiment, and a second one of the plurality of predetermined mobile application program settings define a countdown timer associated with the step of the personalized experiment, wherein the countdown timer is displayed on the display of the mobile device when monitoring the step of the personalized experiment using the mobile device.

9. The fume hood system of claim 1, wherein the two or more of the fume hood parameters include one or more of:
   a timer value associated with the fume hood;
   an experiment identifier identifying an experiment that is associated with the fume hood;
   an experiment status identifying a status of an experiment that is associated with the fume hood; and
   a personnel identifier that identifies a person responsible for an experiment associated with the fume hood.

10. The fume hood system of claim 1, wherein the mobile application program is configured to concurrently display on the display of the mobile device a status of each of two or more distinct experiments currently associated with one or more of the fume hoods.

11. The fume hood system of claim 10, wherein the status of at least one of the two or more experiments associated with one or more fume hoods includes one or more of a timer status and an alarm status.

12. The fume hood system of claim 10, wherein the timer status includes a time remaining indicator for the corresponding experiment.

13. The fume hood system of claim 10, wherein the mobile application program is configured to display an experiment name for each of the two or more experiments associated with the one or more fume hoods.

14. The fume hood system of claim 10, wherein the two or more distinct experiments are associated with two or more different fume hoods.

15. The fume hood system of claim 14, wherein mobile application program is configured to display a fume hood name for each of the two or more experiments, the fume hood name identifies the fume hood that is associated with the respective experiment.

16. The fume hood system of claim 10, wherein the mobile application program is configured to highlight each of the two or more experiments that are associated with the one or more fume hoods that are currently within communication range of the wireless interface, resulting in the corresponding paired wireless connection being active.

* * * * *